Oct. 16, 1923.  
C. R. ALLEN  
1,470,590  
TOP FOR VEHICLES AND THE LIKE  
Filed Aug. 31, 1918  2 Sheets-Sheet 1
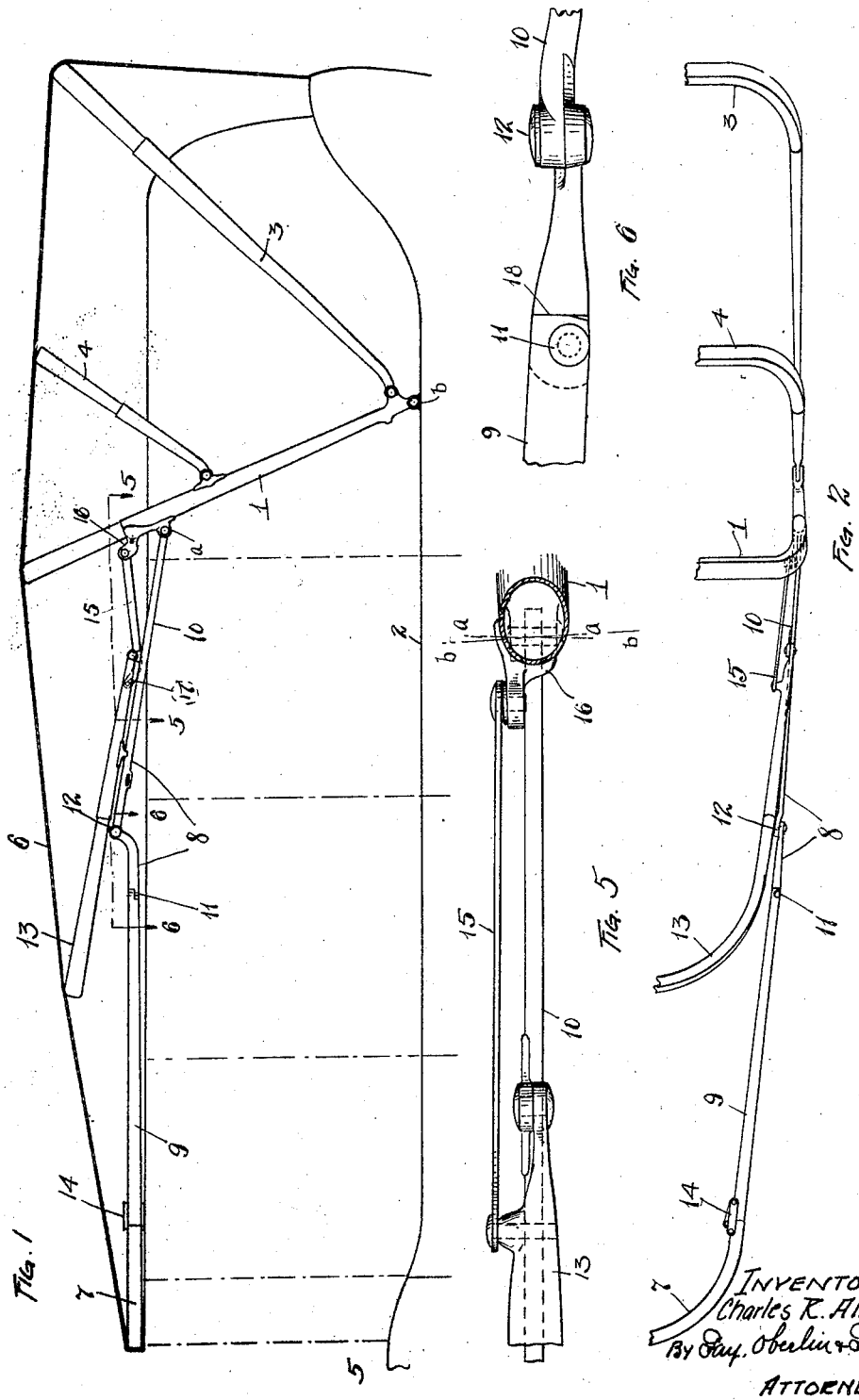
INVENTOR  
Charles R. Allen  
By Day, Oberlin & Day  
ATTORNEYS.

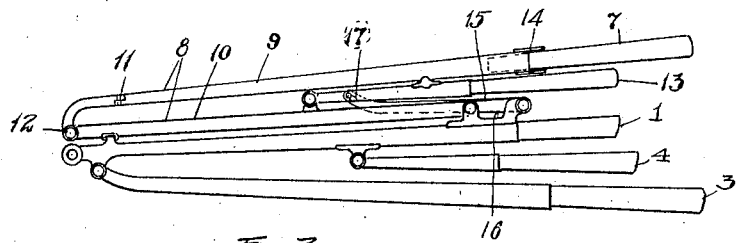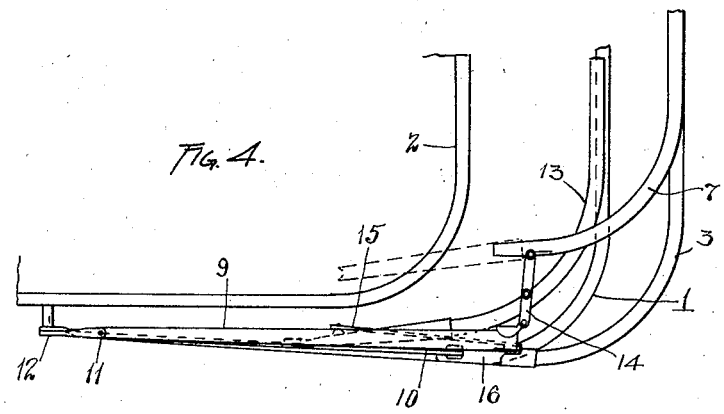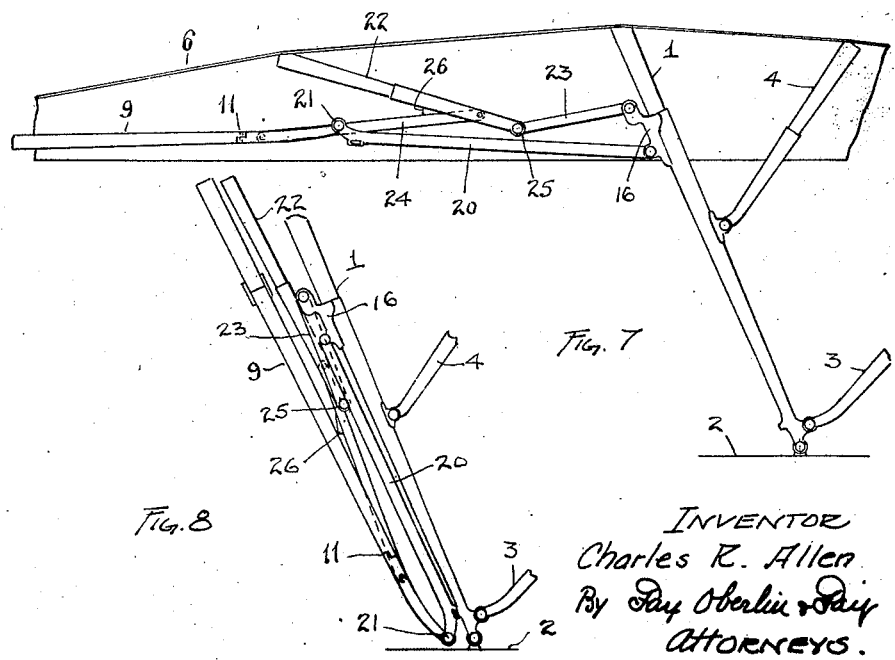

Patented Oct. 16, 1923.

1,470,590

UNITED STATES PATENT OFFICE.

CHARLES R. ALLEN, OF ASHTABULA, OHIO, ASSIGNOR TO THE ASHTABULA BOW SOCKET COMPANY, OF ASHTABULA, OHIO, A CORPORATION OF OHIO.

TOP FOR VEHICLES AND THE LIKE.

Application filed August 31, 1918. Serial No. 252,144.

*To all whom it may concern:*

Be it known that I, CHARLES R. ALLEN, a citizen of the United States, and a resident of Ashtabula, county of Ashtabula, and State of Ohio, have invented a new and useful Improvement in Tops for Vehicles and the like, of which the following is a specification, the principle of the invention being herein explained, and the best mode in which I have contemplated applying that principle, so as to distinguish it from other inventions.

The present improvements relate to that type of vehicle top, commonly known as a "one man" top, in which the necessity for independently supporting the forward bows of the vehicle body has been done away with. One object of the invention is to provide in a top of this type for the approximate conformation of the side lines of said top with the side lines of the vehicle body, which, as is well known, ordinarily converge towards the front. In this respect, the present invention constitutes in effect an improvement on the foldable vehicle top which forms the subject matter of my co-pending application filed March 12, 1918, Serial No. 222,025. A further object of the invention is to provide an improved arrangement of links or braces for sustaining the forwardly extending or outrigger bow.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of the mechanical forms in which the principle of the invention may be used.

In said annexed drawings:—

Fig. 1 is a side elevation of a vehicle top embodying my present improvements, said top being shown in its open or extended condition on a motor vehicle body of conventional form; Fig. 2 is a plan view of such improved top, or rather of one side of the same, the other being merely a duplicate with position of parts reversed; Fig. 3 is a side elevation of the top in its folded condition; Fig. 4 is a plan view of the same in its folded condition; Fig. 5 is a plan view in section of a detail taken on the plane indicated by the line 5—5, Fig. 1; Fig. 6 is a plan view of another detail, as indicated by the line 6—6, Fig. 1; Fig. 7 is a side elevation of a modified construction of top illustrating a different arrangement of bracing or linkage between the main bow and the forwardly extending or outrigger bow, the top being shown in its open or extended condition; and Fig. 8 is a side elevational view of such modified top construction with the outrigger portion folded up against the main top.

As in most types of one man top, I utilize in the framework of the present improved top, a forward main bow 1 pivotally attached to the body 2 of the vehicle adjacent the rear seat, where such vehicle is a two-seated one as illustrated in Fig. 1. Other familiar parts are the rear main bow 3 which is preferably pivotally atttached to such forward main bow near the lower end of the latter, and a supplemental bow 4 which may be provided, if desired, between such two main bows, being shown for illustrative purposes in the figure named as pivotally attached to the forward main bow 1.

All three of the bows just described will be of approximately the same width, and so adapted to fold up and drop clear of the body line, as shown in Fig. 4.

As previously indicated, the sides of the body of most automobiles converge towards the front or dash 5, so that the front seat, as is well known, is adapted to accommodate only two persons, while three may be seated in the rear. If the forward portion of the top, accordingly, is to conform to the body, the several bows included in the forwardly extending frame structure which supports the corresponding portion of the top cover 6, will require to be narrower than those in the rear part of the top frame. Particular difficulty arises in connection with the extreme forward or outrigger bow 7, since the arms, which support the same, when folded up, will lie across the rear corners of the body, thus not only obstructing the rear seat, but preventing the complete collapsing of the top itself.

As in the construction disclosed in my co-pending application above referred to, I overcome this difficulty by connecting the outrigger bow 7 with these arms in such fashion that the outer ends of the latter may be shifted transversely with respect to said bow, in order that they may fall without the sides of the body and at the same time carry the bow clear of the rear of the body. I employ, however, in the present case a somewhat different arrangement of supporting arms for the outrigger bow, and, by means of the particular arrangement of the axes of the pivots that connect the parts together, am able to reduce the number of joints and so correspondingly simplify and strengthen the structure.

Referring to Figs. 1 to 6 inclusive, the general form of the supports 8 for the outrigger bow will be seen to resemble that of my aforesaid co-pending application, in that said supports include in addition to the bow-sockets 9 proper, swinging arms 10, which pivotally connect such bow-sockets with the main bow 1, and these bow-sockets have freely bending horizontal joints 11. However, the upward bending of the joints or elbows 12 between the arms is limited by engagement between such arms and an intermediate bow 13 that is pivotally attached to the latter at approximately its midpoint, so that in this construction a stop or rule joint is unnecessary.

The horizontally bending joints 11 in the bow-sockets 9, on the contrary, are lock or rule joints, as shown in detail in Fig. 6, and permit a slight lateral displacement for oscillation of each bow-socket relatively to outer end of the correspondingly swinging arm 10. The ends of the outrigger bow 7 are adapted to seat in the ends of the sockets when the latter are positioned a proper distance apart; while in order to lock the bow in such seated position, as well as to flexibly connect the same with the sockets in the unseated position of the bow, articulated links 14 are provided. The operation of these links, both in holding the outrigger bow in its seated position, and when unseated and displaced laterally with respect to the sockets, will be readily apparent from an inspection of the figures, more especially Figs. 2 and 4.

In order to assist in the folding of the intermediate bow 13, a link 15 is connected with the lower end of the same near its point of attachment to each swinging side arm 10, and the forward main bow 1 at a point above the point of attachment of such side arm thereto, a bracket 16 on the main bow providing the points of connection in both instances. The forward end of this link 15 is bent upwardly at an angle approaching a right angle, and has a slot 17 that slidably pivotally connects it with the intermediate bow. The axis of the pivot, whereby the side arm is connected to the main bow, as indicated by the line a—a, Fig. 5, is placed at such an angle that the side arm, while lying parallel with the main bow in its folded condition (see Fig. 4) is caused to incline inwardly from the plane in which the main bows 1 and 3 lie. Accordingly, by bending the forward ends of the links in the fashion just described, it will be observed that the latter drop beneath and cross over under the ends of the intermediate bow in the folded condition of the top, as shown in Figs. 3 and 4.

Referring to the horizontally swinging joint 11 in the sockets 9, the pivot, it will be observed, is located as close to the outer side of the arm ends as possible. There is no particular strain upon the joint when it is straightened out, as it occupies this position only when the top is folded, but when the top is extended the bending strain on the joint is considerably greater. The arrangement of the pivot provides a wider abutment 18 to resist this last mentioned strain than would be otherwise possible.

In the modified construction illustrated in Figs. 7 and 8 I show the side arm 20 with a stop or lock joint 21 that serves to prevent upward bending of the arm when extended in the horizontal position illustrated in Fig. 1, just as in my co-pending application Serial No. 222,025. However, by turning the axis of the pivot which connects the rear end of this arm with the main bow, I am enabled to do away with any horizontally turning joint in the rear portion of the arm, just as in the construction illustrated in Figs. 1 to 6 inclusive. I furthermore show in Figs. 7 and 8 an intermediate bow 22 that is wholly free from direct connection with the arm in question. Instead, said intermediate bow is supported by means of two links 23 and 24, the rearmost of which is pivotally connected at its one end with the main bow at a point above the pivotal point of attachment of the arm therewith, while the forward link 24 extends from a point on the intermediate bow slightly spaced from its lower end, to a point on the bow-socket 9 between the stop joint 21 and the horizontally bending joint 11 in said bow-socket. The joint between the rear link 23 and the intermediate bow 20 is likewise a stop or lock joint, which serves to hold the intermediate bow in the proper angular position with respect to the arm and outrigger bow, and if desired, although not essential, a stop 26 may also be utilized in connection with the joint between the forward link 24 and said intermediate bow, thus rendering the construction correspondingly more rigid.

In this modified construction, when the side arms 20 are broken downwardly in collapsing the top, the links 23 and 24 will obviously serve to swing the intermediate bow from its extended position in a clockwise direction, and, by properly gaging the length of the links, said intermediate bow is brought back parallel with the main bow when the outrigger bow reaches a similar position as shown in Fig. 8.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a top for vehicles and the like, the combination of a main bow pivotally attached to the vehicle body; of arms pivotally attached to said main bow, said arms being adapted to lie alongside said main bow in folded condition of the top and to extend substantially horizontally when top is open; an outrigger bow, suitably attached to the free ends of said arms; a floating intermediate bow; and plural independent links connecting spaced points on each side of said intermediate bow with the corresponding sides of said main and outrigger bows, respectively.

2. In a top for vehicles and the like, the combination of a main bow pivotally attached to the vehicle body; of arms pivotally attached to said main bow, said arms being adapted to lie alongside said main bow in folded condition of the top and to extend substantially horizontally when top is open; an outrigger bow suitably attached to the free ends of said arms; a floating intermediate bow; links connecting the inner ends of said intermediate bow with the sides of said main bow above the points of attachment of said arms to the latter; and other links independent of said first-named links extending from points on the sides of said intermediate bow spaced from the end thereof to the sides of said outrigger bow.

3. In a top for vehicles and the like, the combination of a main bow pivotally attached to the vehicle body; of arms pivotally attached to said main bow, said arms being adapted to lie alongside said main bow in folded condition of the top and to extend substantially horizontally when top is open; an outrigger bow suitably attached to the free ends of said arms; a floating intermediate bow; links connecting the inner ends of said intermediate bow with the sides of said main bow above the points of attachment of said arms to the latter; and other links independent of said first-named links extending from points on the sides of said intermediate bow spaced from the end thereof to the sides of said outrigger bow, one set of said links having stop-joint connection with said intermediate bow.

4. In a top for vehicles and the like, the combination of a main bow pivotally attached to the vehicle body; of arms pivotally attached to said main bow, said arms being adapted to lie alongside said main bow in folded condition of the top and to extend substantially horizontally when top is open; an outrigger bow suitably attached to the free ends of said arms; a floating intermediate bow; links connecting the inner ends of said intermediate bow with the sides of said main bow above the points of attachment of said arms to the latter; and other links independent of said first-named links extending from points on the sides of said intermediate bow spaced from the end thereof to the sides of said outrigger bow, both sets of said links having stop-joint connection with said intermediate bow.

Signed by me, this 27 day of August, 1918.

CHARLES R. ALLEN.